United States Patent
Lyons et al.

(10) Patent No.: US 10,377,068 B2
(45) Date of Patent: Aug. 13, 2019

(54) METHOD AND APPARATUS FOR NON-WOVEN TRIM PANELS

(71) Applicant: INTEVA PRODUCTS, LLC, Troy, MI (US)

(72) Inventors: Kevin Mark Lyons, Clawson, MI (US); Edward J. Wenzel, Troy, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 12 days.

(21) Appl. No.: 15/706,922

(22) Filed: Sep. 18, 2017

(65) Prior Publication Data

US 2018/0085978 A1 Mar. 29, 2018

Related U.S. Application Data

(60) Provisional application No. 62/398,765, filed on Sep. 23, 2016.

(51) Int. Cl.
| | | |
|---|---|---|
| *B60J 5/00* | (2006.01) | |
| *B29C 45/14* | (2006.01) | |
| *B32B 5/26* | (2006.01) | |
| *B29K 101/12* | (2006.01) | |
| *B29L 31/30* | (2006.01) | |
| *B30B 15/34* | (2006.01) | |
| *B60R 13/02* | (2006.01) | |

(52) U.S. Cl.
CPC .. *B29C 45/14631* (2013.01); *B29C 45/14221* (2013.01); *B29C 45/14688* (2013.01); *B29C 45/14811* (2013.01); *B32B 5/26* (2013.01); *B29C 45/14786* (2013.01); *B29K 2101/12* (2013.01); *B29L 2031/3041* (2013.01); *B30B 15/34* (2013.01); *B60R 13/02* (2013.01)

(58) Field of Classification Search
CPC ..... B29C 66/7212; B29C 66/71; B32B 27/12; B32B 2451/00; B32B 2605/003; C08L 2666/06; B60R 13/02; B29L 2031/3005
USPC .............................................. 296/146.7, 1.08
See application file for complete search history.

(56) References Cited

U.S. PATENT DOCUMENTS

| | | | | |
|---|---|---|---|---|
| 2007/0281133 A1* | 12/2007 | Smith | ............... | B29C 45/14811 428/161 |
| 2009/0174121 A1* | 7/2009 | Hayes | ................. | B29C 45/1671 264/447 |
| 2017/0080617 A1* | 3/2017 | Gassman | .......... | B29C 45/14631 |
| 2018/0085978 A1* | 3/2018 | Lyons | ............... | B29C 45/14221 |

* cited by examiner

*Primary Examiner* — Kiran B Patel
(74) *Attorney, Agent, or Firm* — Cantor Colburn LLP

(57) ABSTRACT

A method of forming a trim panel is provided. The method includes the steps of: heating a non-woven material to a predetermined temperature; applying a decorative film having perforations to a first surface of the heated material to create a bilaminate; placing the bilaminate layer into a cavity of a tool such that the decorative film is facing the cavity; heating the cavity; and injecting a thermoplastic resin into the tool such that the thermoplastic resin is adhered to a second surface of the material, the second surface being opposite to the first surface.

5 Claims, 8 Drawing Sheets

Step 1

Nonwoven material is placed between plates of contact heating press

Fiber Mat Compression Forming w/Non-Foam Backed Film Cladding

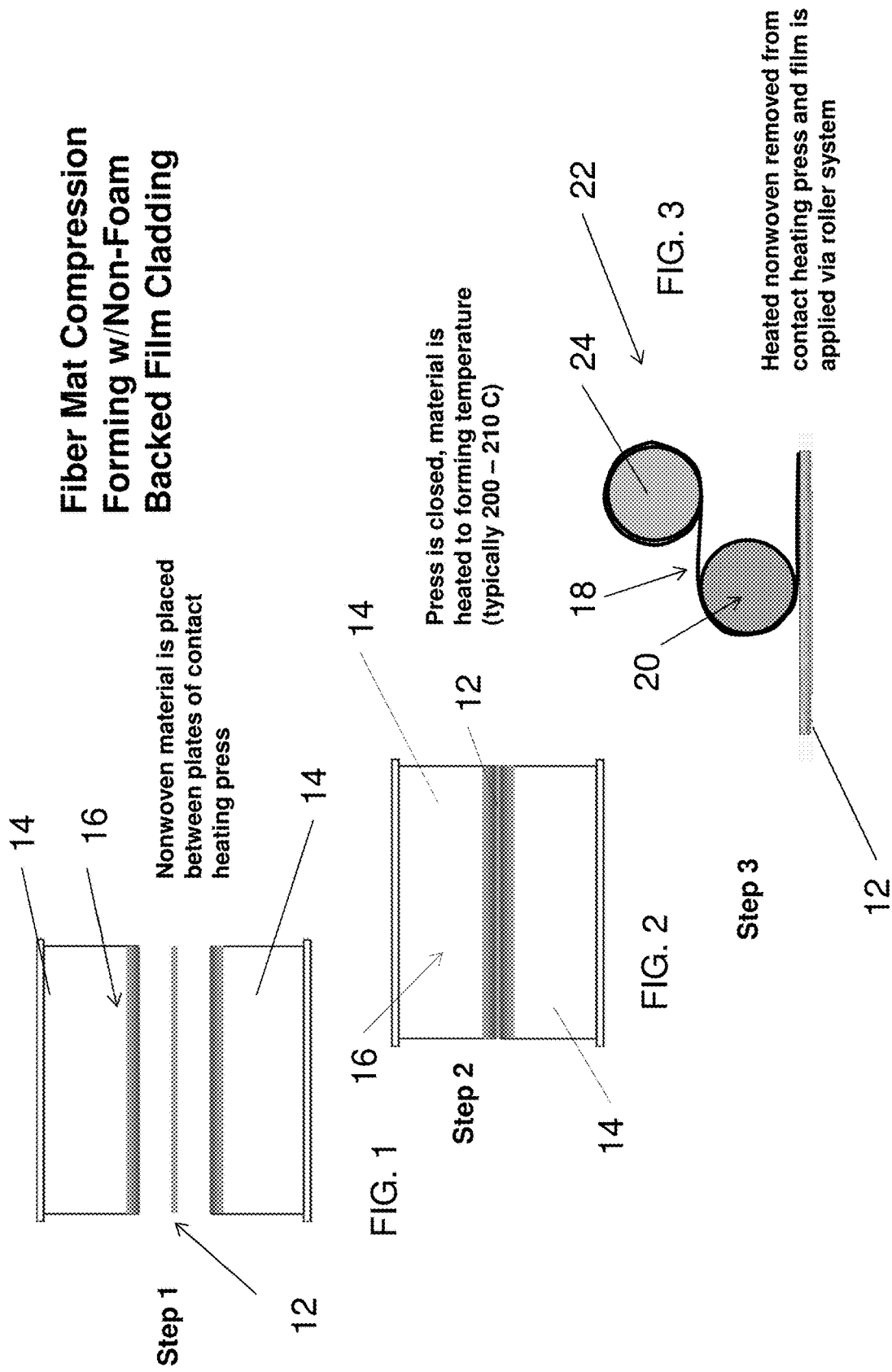

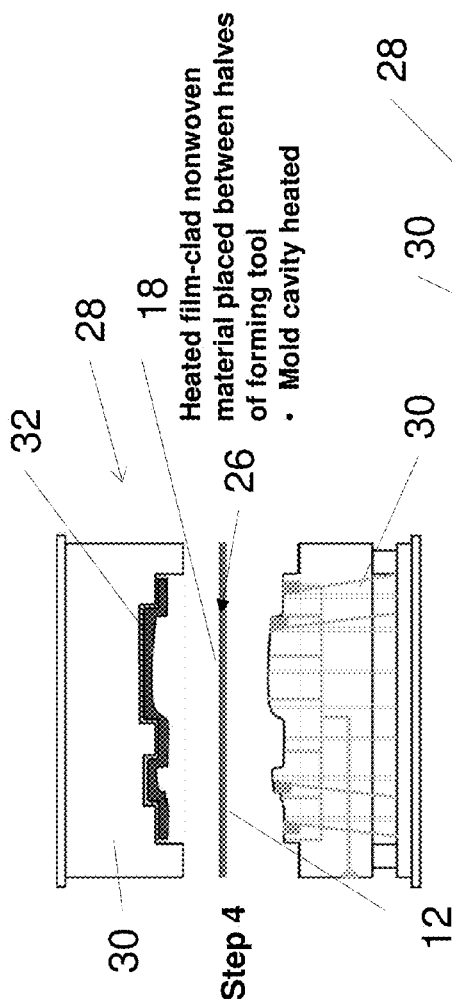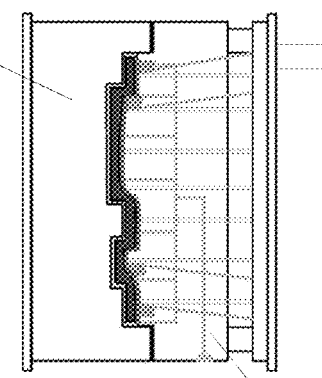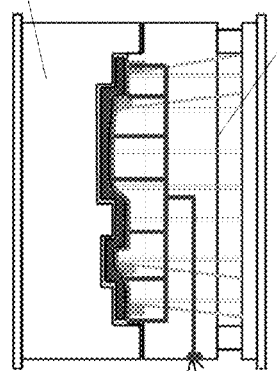

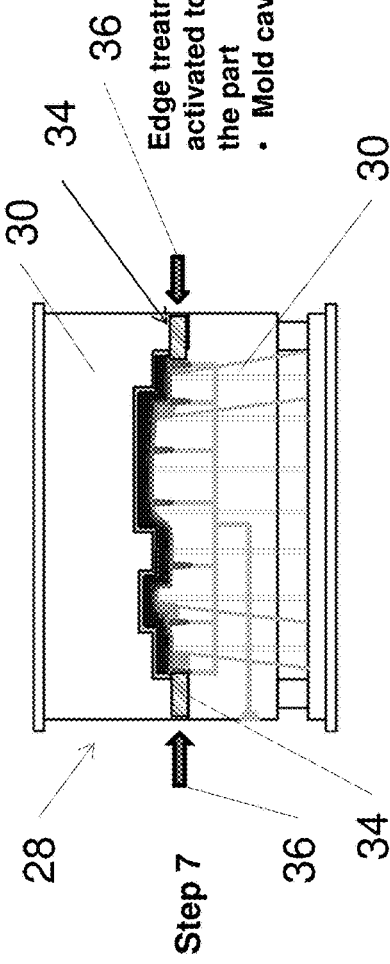
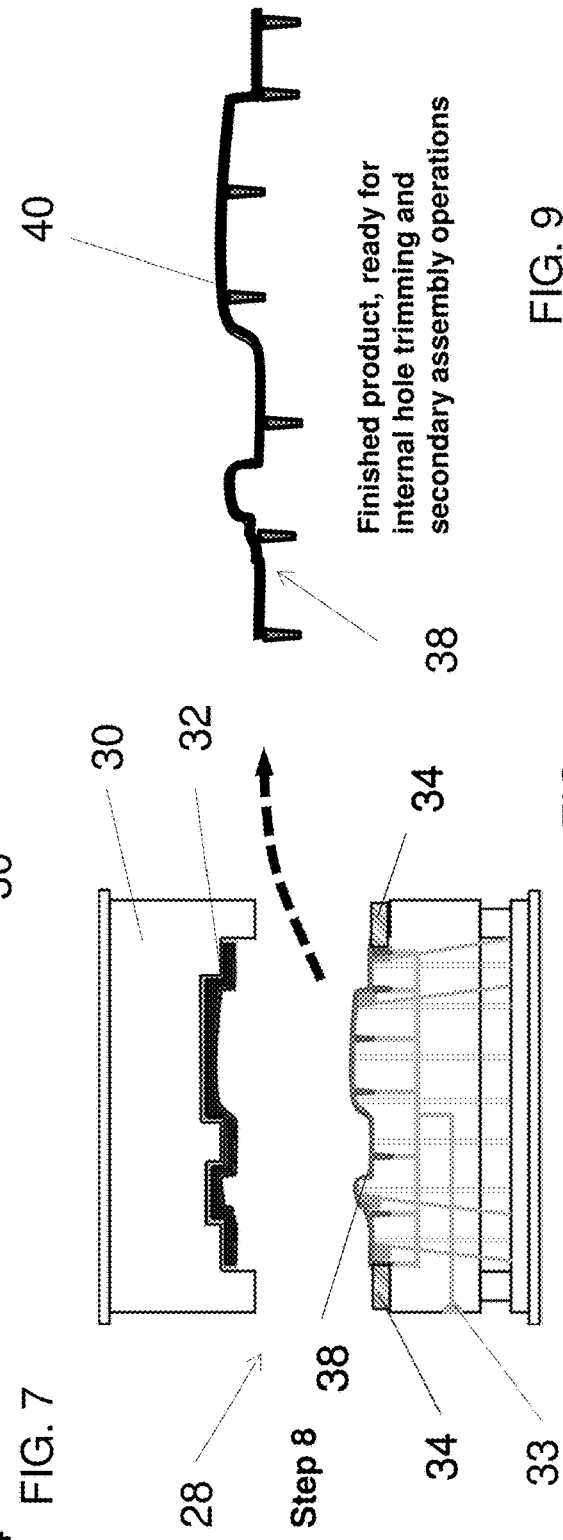
FIG. 7
FIG. 8
FIG. 9

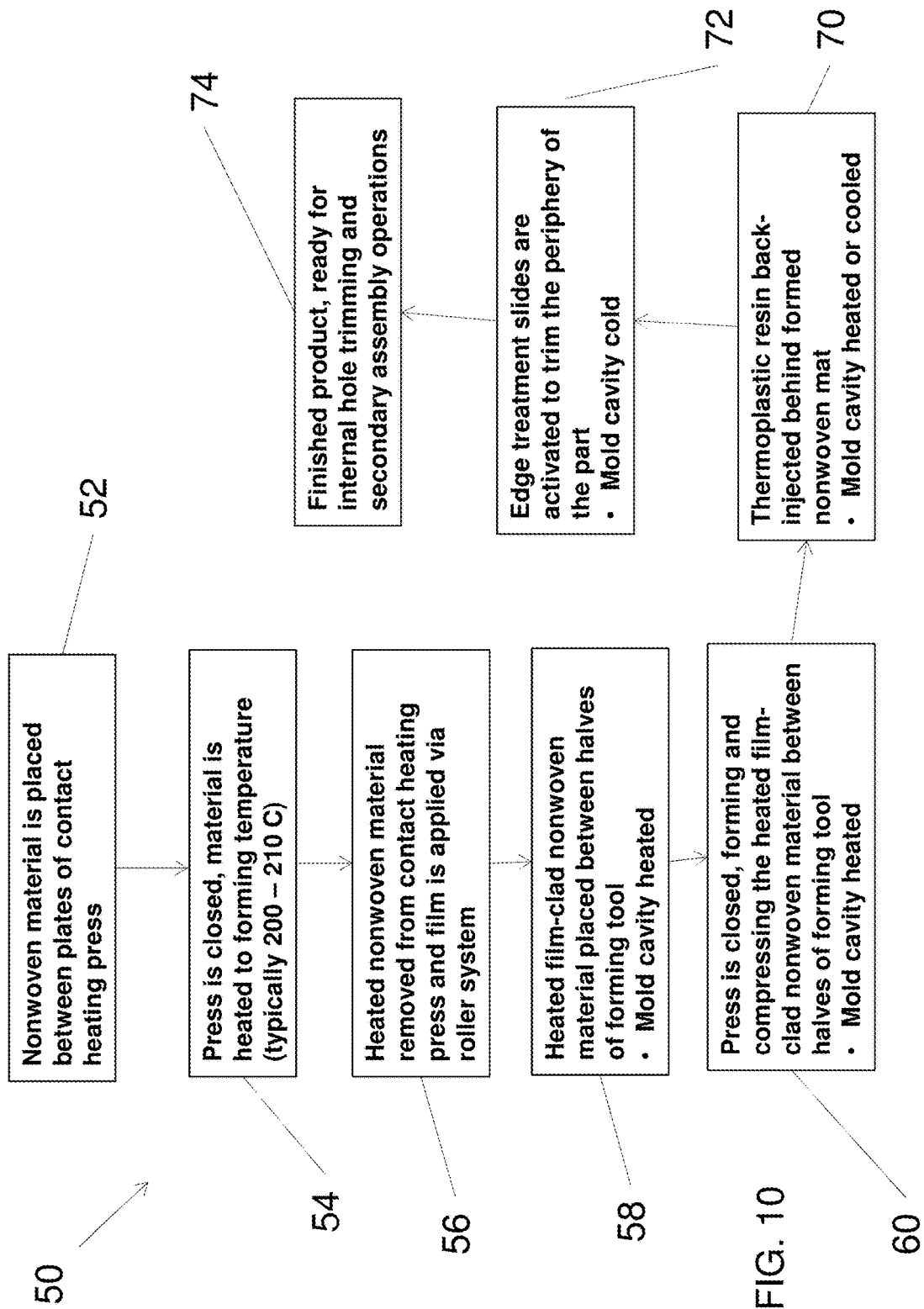

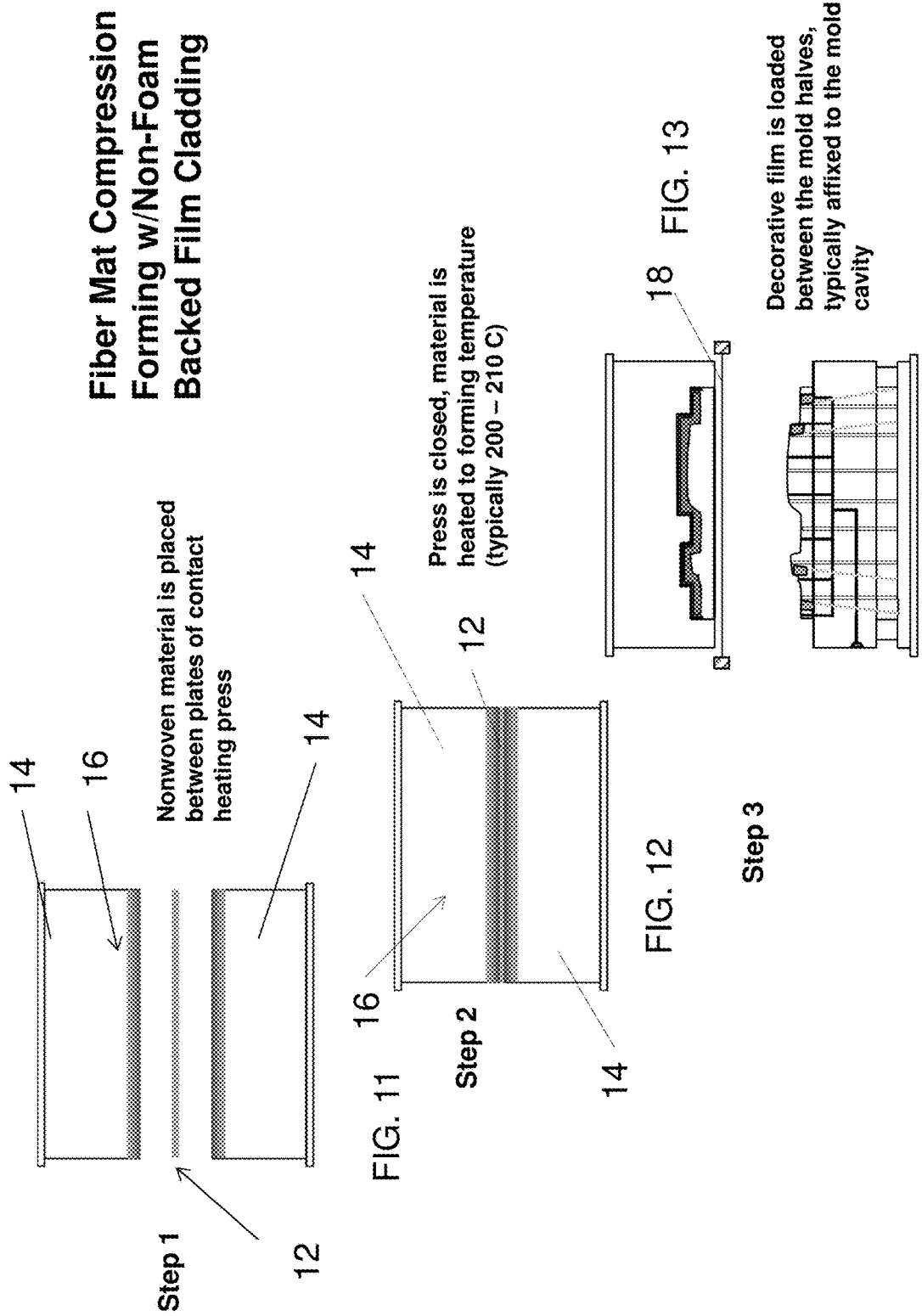

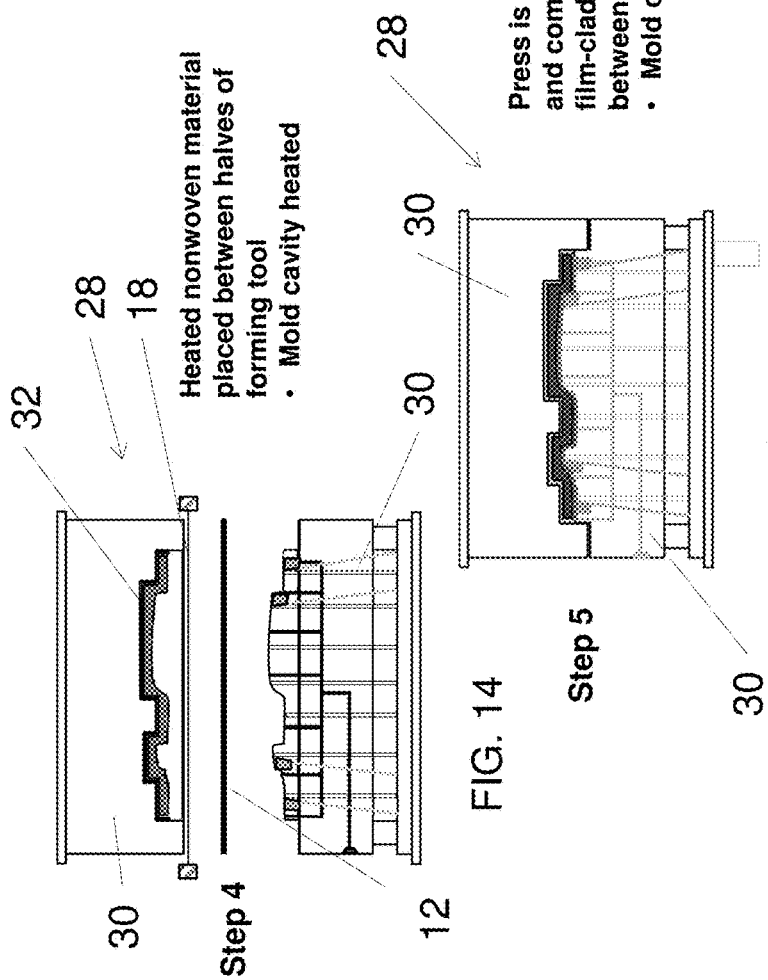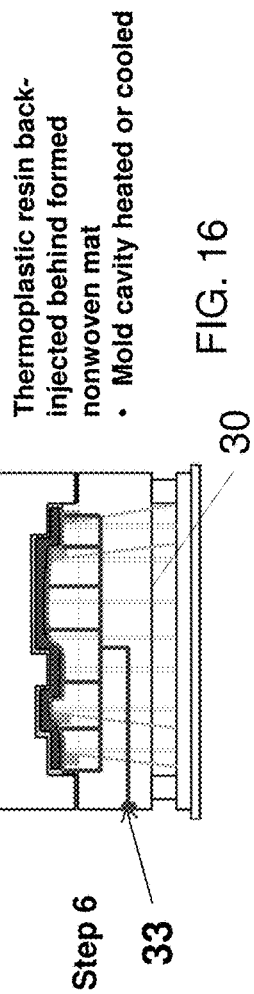

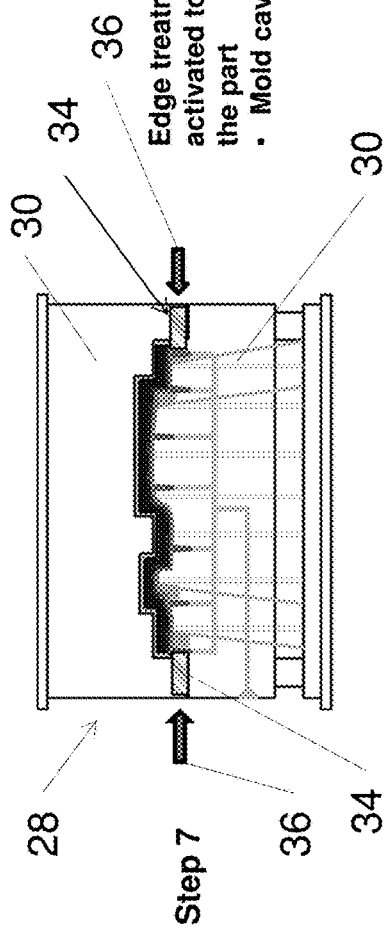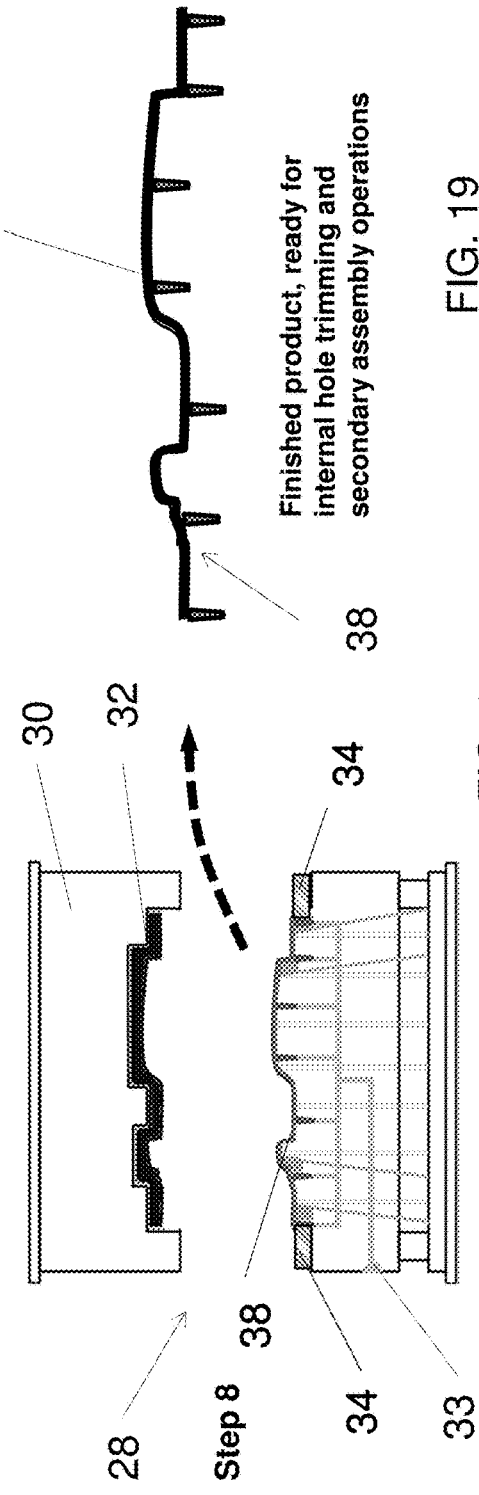

METHOD AND APPARATUS FOR NON-WOVEN TRIM PANELS

CROSS-REFERENCE TO RELATED APPLICATION

This application claims the benefit of 62/398,765, filed Sep. 23, 2016, which is incorporated herein by reference in its entirety.

BACKGROUND

This invention relates to a method and apparatus for forming non-woven trim panels and trim panels formed by the method. More particularly, this invention relates to a method and apparatus for forming trim panels for automotive interiors.

Recent industry demands have been directed to reducing vehicle weights though the many components used in a vehicle. One area of interest for reduced vehicle weight is in the area of vehicle interiors, which may include large interior substrate panels.

Accordingly, it is desirable to provide a vehicle interior trim piece that is aesthetically pleasing while also providing the required structural integrity and durability.

SUMMARY OF THE INVENTION

A method of forming a trim panel is provided. The method includes placing a non-woven material in a heating press; heating the non-woven material to a predetermined temperature; applying a decorative film to a first surface of the heated non-woven material to create a bilaminate; wherein the decorative film has perforations having an area of $1.0 \times 10^{-5}$ to $4.0 \times 10^{-5}$ square inches, a perforation density of 200 to 350 perforations per square inch, and a porosity of 0.25% to 0.90%; placing the bilaminate into a cavity of a forming tool such that the decorative film is facing the cavity; heating the cavity; closing the forming tool; and injecting a thermoplastic resin into the forming tool such that the thermoplastic resin is adhered to at least a portion of a second surface of the non-woven material, the second surface being opposite to the first surface.

An alternative method of forming a trim panel includes placing a non-woven material in a heating press; heating the non-woven material to a predetermined temperature; inserting a decorative film in a cavity of a forming tool wherein the film has perforations having an area of $1.0 \times 10^{-5}$ to $4.0 \times 10^{-5}$ square inches, a perforation density of 200 to 350 perforations per square inch; and a porosity of 0.25% to 0.90%, heating the cavity of the forming tool; inserting the heated non-woven material between the forming tool half and the decorative film such that a first surface of the non-woven material contacts the decorative film; closing the tool; and injecting a thermoplastic resin into the forming tool such that the thermoplastic resin is adhered to at least a portion of the second surface of the material, the second surface being opposite to the first surface.

In addition to one or more of the features described above, or as an alternative to any of the foregoing embodiments, the trim panel may be a portion of a vehicle interior.

In addition to one or more of the features described above, or as an alternative to any of the foregoing embodiments, the decorative film may be applied to the material via a contact roller of a roller system In addition to one or more of the features described above, or as an alternative to any of the foregoing embodiments, the decorative film may be a thermoplastic olefin.

In addition to one or more of the features described above, or as an alternative to any of the foregoing embodiments, the injection pressures of the thermoplastic resin may be limited using sequential valve gating, foaming agents, or flow enhancers in order to significantly reduce injection pressure.

In addition to one or more of the features described above, or as an alternative to any of the foregoing embodiments, the predetermined temperature may be in the range of 200-210 degrees Celsius.

Also described herein is a trim piece formed by any of the foregoing embodiments.

In addition to one or more of the features described above, or as an alternative to any of the foregoing embodiments, a trim panel includes a non-woven material of material; a decorative film applied to a first surface of the non-woven material wherein the film has perforations having an area of $1.0 \times 10^{-5}$ to $4.0 \times 10^{-5}$ square inches, a perforation density of 200 to 350 perforations per square inch, and a porosity of 0.25% to 0.90%; and a thermoplastic resin (33) secured to at least a portion second surface of the non-woven material, the second surface being opposite to the first surface.

In addition to one or more of the features described above, or as an alternative to any of the foregoing embodiments, the trim panel may be a portion of a vehicle interior.

In addition to one or more of the features described above, or as an alternative to any of the foregoing embodiments, the trim panel may be a portion of a vehicle door.

BRIEF DESCRIPTION OF THE DRAWINGS

Other features, advantages and details appear, by way of example only, in the following description of embodiments, the description referring to the drawings in which:

FIGS. 1-10 illustrate a method and apparatus for forming a decorative trim panel in accordance with one non-limiting embodiment of the disclosure; and FIG. 11-20 illustrate a method and apparatus for forming a decorative trim panel in accordance with another non-limiting embodiment of the disclosure.

Figure 20:
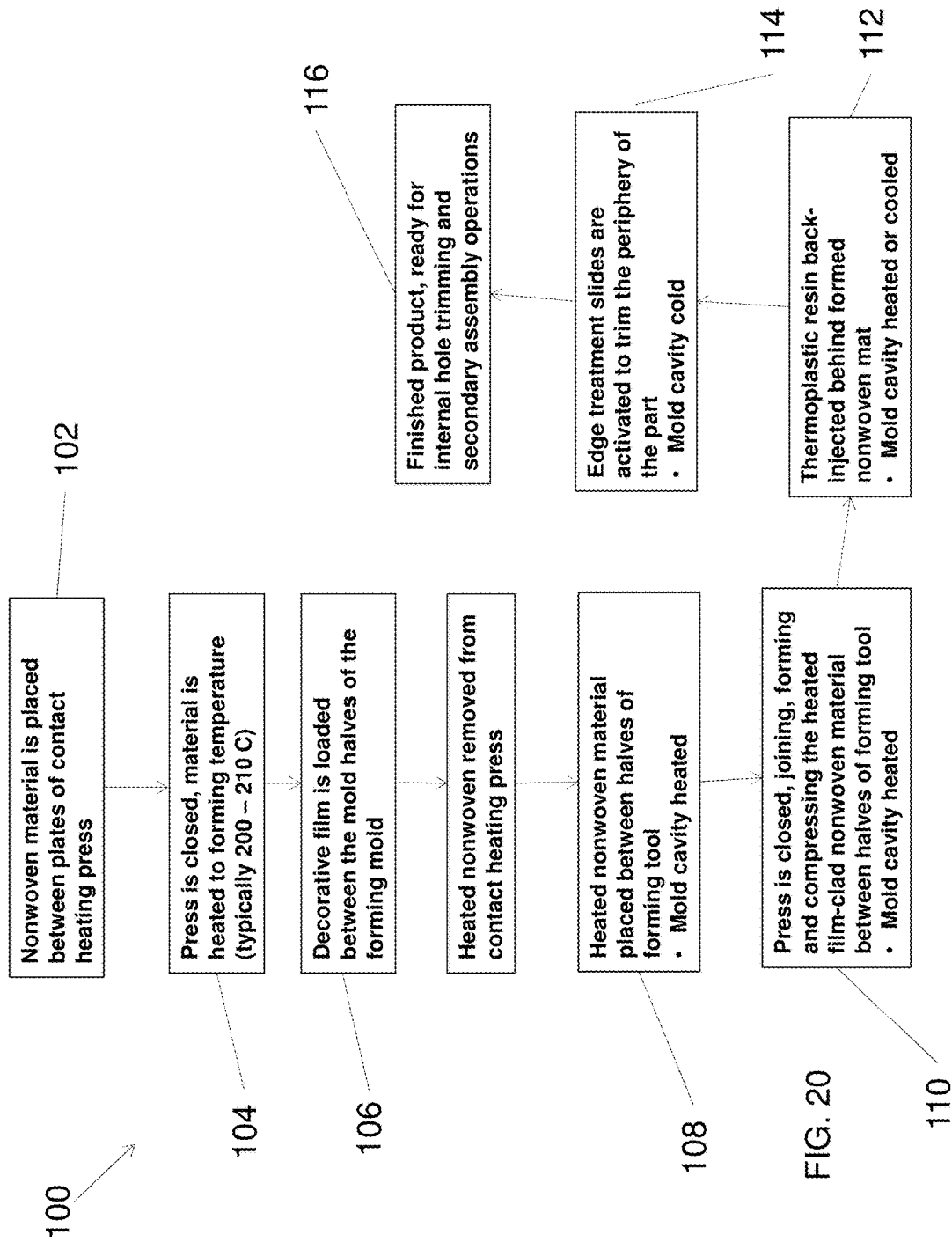

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Turning now to the drawings, wherein to the extent possible like reference numerals are utilized to designate like components throughout the various views, in FIGS. 1-10 it is seen that a method and apparatus for forming a decorative trim panel in accordance with non-limiting embodiments of the disclosure is presented. In accordance with various embodiments a method of producing a first surface finished non-woven directly from the compression/injection tooling is disclosed. As such, secondary tooling and processes are now required only for localized cladding and final assembly operations.

In one embodiment, a decorative film thermoplastic olefin (such as TPO compact sheet) is used to achieve a hard, grained surface finish of the product or trim piece. In a first step, a non-woven material 12 is heated to an appropriate processing temperature, which may be for example 200-210 degrees Celsius. Temperatures greater or less than the aforementioned range are considered to be within the scope of various embodiments.

Heating may be achieved by contact, hot air or IR heat. The non-woven material may be heated to a first temperature on a first side and a second temperature on a second side wherein the first temperature does not equal the second temperature.

The fibers of the non-woven material 12 may include natural fibers, manmade fibers or a combination of both, with a high length-to-width ratio and suitable characteristics for being processed into the material. Some non-limiting exemplary fiber types may be polypropylene, polyester, kenaf, hemp, flax, jute, sisal, glass, carbon and combinations thereof. In some embodiments the fibers are a combination of flax fibers and polypropylene fibers. The non-woven material, prior to heating, may have a thickness of 5 to 25 millimeters (mm), or, 7 to 20 mm. The non-woven material, prior to heating, may have an areal weight of 600 to 2500 grams per square meter ($g/m^2$), or 700 to 2000 $g/m^2$.

In one embodiment and as illustrated in FIG. 1, the non-woven material 12 is placed between a pair of plates 14 of a contact heating press or oven 16. In FIG. 2, the press is closed and the material 12 is heated.

Once the non-woven material 12 is heated to the desired temperature a decorative film 18 is applied to the heated non-woven material 12. The film may be applied by a contact roller 20 or roller system 22 having a contact roller 20 and a supply spool 24 of the decorative film 18. The film 18 is perforated in order to aid in the release of trapped air or gases between the film 18 and the non-woven material 12 during forming.

In some embodiments, the decorative film 18 is a thermoplastic olefin (such as TPO compact sheet) in order to achieve a hard, grained surface finish of the product or trim piece. In some embodiments, the decorative film 18 is a coextruded having a TPO layer and a polypropylene layer. The decorative film may have a total thickness of 0.1 to 1.1 millimeters (mm), or 0.2 to 0.7 mm, or 0.2 to 0.5 mm.

The film has perforations (holes). The perforations may be any suitable shape. In some embodiments the perforations are round or ovoid. The perforations may have an area of $1.0 \times 10^{-5}$ to $4.0 \times 10^{-5}$ square inches. When the perforation area is discussed herein it is the area of a single perforation unless otherwise indicated. The density of perforations can be 200 to 350 perforations per square inch. The perforations may be arranged in a suitable pattern, such as offset rows. The film can have a total open area (porosity) of 0.25 to 0.90%. Total open area is defined as the total area of holes divided by the total area of the film. The perforated film may have a tensile strength and tensile modulus suitable to making a trim panel.

In some embodiments, the decorative film 18 is a layer of thermoplastic olefin laminated to a layer of foam. The thickness may be 0.6 mm to 4.7 mm.

The decorative film 18 now clad with the non-woven material 12 is illustrated as a bilaminate 26 which is then transferred to a forming tool 28, illustrated in at least FIGS. 5-8. The bilaminate 26 is placed between the two complimentary halves 30 of the forming tool 28. In one embodiment, the cavity 32 of one of the halves 30 is heated. The cavity half 30 of the tool 28 that is heated is heated near the show surface of the part (e.g., decorative film 18) in order to provide a uniform gloss and consistent grain depth replication across the entire part surface. In FIG. 5, the forming tool 28 is closed and graining and forming bilaminate 26 occurs in order to form a final part shape. The use of heat in the cavity provides a controllable gloss to the show surface of the part. This is in part due to the depth of the grain cavities in the tool of cavity 32. The gloss of the show surface is greater for lower grain cavity depths while a lower gloss is provided with higher grain cavity depth. In addition, improved gloss consistency also results from a more uniform and precise polymer replication of the tool surface which is elevated in temperature, and as such the gloss consistency is provided regardless of grain type or depth. Thus, changing the grain depth is not required in order to realize desired visual enhancements of the show surface.

In some embodiments the cavity is porous or has small vent holes to allow any out gas to escape from the materials being molded. In some embodiments the tool is closed, briefly opened to allow any out gas to escape, and then closed to complete the molding operation.

Shortly after the tool is closed, a thermoplastic resin 33 is injected behind the non-woven material, producing backside attachment features and reinforcing ribs of the part being formed. The tool can be either heated or cooled at this step. This is illustrated in at least FIG. 6.

During the next step and as illustrated in at least FIG. 7, edge treatment slides 34 are activated and pushed in laterally in the direction of arrows 36 in order to finish a periphery edge of the part being formed. This step is performed when the tool is unheated or cold.

At the next step and as illustrated in at least FIG. 8, the tool is opened and a formed part 38 is demolded. In the demolded part, the combination of the non-woven material and the decorative skin may have a thickness of 0.5 to 2.5 mm, or, 0.9 to 1.5 mm. In one embodiment, the formed part 38 may be a portion of a vehicle interior such as a trim panel, console, door panel or instrument panel or any other product that has a show surface and requires structural integrity and light weight requirements. Upon demold, the formed part 38 is transferred to secondary tooling (not shown) for trimming of internal openings, application of localized claddings, and final assembly. The compression/injection process described above produces a film clad non-woven part that emulates a mold-to-color grained injection molded thermoplastic product at a significantly reduced mass.

In some embodiments, the injection pressures need to be limited in order to eliminate read through of the back the injected features onto the show surface 40 of the formed part 38 as well as to ensure filling of these features. Use of sequential valve gating of the injection drops and higher melt flow thermoplastic materials are typically used to minimize the injection pressure. In one embodiment foaming agents (either chemical or physical) are used in the thermoplastic material to significantly reduce injection pressure while enabling the use of a highly filled thermoplastic resin as required in order to achieve the desired level of mechanical properties of the thermoplastic material.

As noted above, gloss variation on the show surface of the part resulting from inconsistent injection and forming pressures is eliminated via the use of rapid heating and cooling technology incorporated into the cavity half of the forming tool. Elevating the temperature of the tool cavity during compression ensures that the tooling surface will be replicated uniformly across the part and fibers will be contained beneath the surface 40 of the part 38. Elevated tool temperature can be maintained during the back injection phase as required to further improve surface appearance. The tooling is then cooled sufficiently prior to back injection and subsequent part demold.

Referring now to FIG. 10, a method 50 for forming the trim component or part 38 in accordance with one non-limiting embodiment is illustrated. As mentioned above and at step 52, a non-woven material is placed between plates of contact heating press. Thereafter and at step 54, the press is closed and the material is heated to forming temperature (typically 200-210 degrees C.). Thereafter and at step 56, the heated non-woven material is removed from the contact heating press and a film is applied via roller system to form the bilaminate. Thereafter and at step 58, the bilaminate is placed between halves of tool and the tool cavity is heated. Thereafter and at step 60, the press is closed, and the heated film-clad non-woven material is formed and compressed between halves of forming tool while the tool cavity heated. Thereafter and at step 70, a thermoplastic resin is back-injected behind the bilaminate while the tool cavity heated. Thereafter and at step 72, edge treatment slides are activated to trim the periphery of the part and the tool cavity is cold or unheated. At step 74, the finished product is removed from the tool and is ready for internal hole trimming and secondary assembly operations.

As illustrated in FIGS. 11-20, an alternative embodiment is illustrated. First, a non-woven material 12 is heated (via contact or IR heat) in an oven 16 to an appropriate processing temperature (FIGS. 11 and 12). A decorative film 18 is placed is placed in the tool cavity 32 (FIG. 13). In some embodiments the tool cavity is heated prior to placing the decorative film in the cavity. In some embodiments the decorative film is heated after being placed in the cavity and prior to contact with the non-woven material.

The heated non-woven material 12 is placed in the tool cavity 32 adjacent to the decorative film 18 and the tool is closed (FIGS. 14 and 15). In some embodiments the cavity 30 is porous or has small vent holes to allow any out gas to escape from the materials being molded. In some embodiments the forming tool is closed, briefly opened to allow any out gas to escape and then closed to complete the molding operation. After the forming tool is closed, graining and forming of the decorative film 18 to the non-woven material 12 occurs and the resulting bilaminate is formed into a final part shape. The decorative film is perforated in order to aid in the release of trapped gases.

The film has perforation (holes). The perforations may be any suitable shape. In some embodiments the perforations are round or ovoid. The perforations may have an area of $1.0 \times 10^{-5}$ to $4.0 \times 10^{-5}$ square inch. The density of perforations can be 200 to 350 perforations per square inch. The perforations may be arranged in a suitable pattern, such as offset rows. The film can have a total open area (porosity) of 0.25 to 0.90%. Total open area is defined as the total area of holes divided by the total area of the film. The perforated film may have a tensile strength and tensile modulus suitable to making a trim panel.

Shortly after forming tool close, a thermoplastic resin 33 is injected behind the non-woven material 12, producing backside attachment features and reinforcing ribs (FIG. 16). In FIG. 17, the edge treatment slides 34 are activated in the direction of arrows 36 to finish the periphery edge of the part 38 while the tool is cold or cooling.

In FIG. 18, the tool opens and the part 38 is demolded. Referring now to FIG. 20 a method 100 for forming the trim component or part 38 in accordance with one non-limiting embodiment is illustrated. As mentioned above and at step 102 a non-woven material is placed between plates of contact heating press. Thereafter and at step 104, the press is closed and the material is heated to forming temperature (typically 200-210 degrees C.). Thereafter and at step 106, a decorative film is loaded between the halves of the forming tool such as a compression mold. Thereafter and at step 108, the heated non-woven material is placed between halves of the forming tool adjacent to the decorative film, and the tool cavity is heated. Thereafter and at step 110, the tool is closed, forming and compressing the heated non-woven material and decorative film between halves of a forming tool and the tool cavity is heated. Thereafter and at step 112, a thermoplastic resin is back-injected behind the formed bilaminate while the tool cavity heated. Thereafter and at step 114, edge treatment slides are activated to trim the periphery of the part and the tool cavity is cold or unheated. At step 116, the finished product is removed from the tool and is ready for internal hole trimming and secondary assembly operations.

In any of the above embodiments a barrier layer may be applied to the second surface of the non-woven material prior to injecting the thermoplastic resin. The barrier layer can be a thermoplastic material with a higher melting temperature than the thermoplastic material being injected into the tool. Without being bound by theory it is believed that the barrier layer can help isolate the decorative layer from the temperature and pressure of injection molded material thereby improving the finish of the final part. The barrier layer can have a thickness of 0.1 to 1.1 mm.

Some advantages of the embodiments of this invention include: improved appearance; well defined grain, sharp radii and uniform surface gloss; first surface finish achieved without the need for a secondary IMG lamination step; surface gloss adjustable via temperature setting of tool cavity surface; cost savings: a first surface finished product formed, back injected, and perimeter trimmed in a single tool; no adhesives between top coating (film or spray) and non-woven substrate or material; the mass of product is minimized; minimal thickness topcoat required when formed with a non-woven substrate; a low area weight non-woven with back-injected ribbing.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation. The numerical ranges described herein are non-limiting ranges. Values outside of the described non-limiting ranges are considered to be within the scope of various embodiments.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A trim panel (38), comprising:

a non-woven material (12);

a decorative film (18) applied to a first surface of the non-woven material (12) wherein the film has perforations having an area of $1.0 \times 10^{-5}$ to $4.0 \times 10^{-5}$, a perforation density of 200 to 350 perforations per square inch, and a porosity of 0.25% to 0.90%; and a thermoplastic resin (33) secured to at least a portion of a second surface of the non-woven material (12), the second surface being opposite to the first surface.

2. The trim panel as in claim 1, wherein the trim panel (38) is a portion of a vehicle interior.

3. The trim panel as in claim 1, wherein the trim panel is a portion of a vehicle door.

4. The trim panel as in claim 1, wherein the thermoplastic resin secured to at least a portion of the second surface of the non-woven material forms a backside attachment feature.

5. The trim panel as in claim 1, wherein the thermoplastic resin secured to at least a portion of the second surface of the non-woven material forms a reinforcing rib.

* * * * *